US012368839B2

(12) United States Patent
Underhill et al.

(10) Patent No.: US 12,368,839 B2
(45) Date of Patent: Jul. 22, 2025

(54) CAMERA SYSTEM IN SITUATION BUILT-IN-TEST

(71) Applicant: Moog Inc., East Aurora, NY (US)

(72) Inventors: Mark J. Underhill, West Falls, NY (US); Richard Fosdick, Clarence Center, NY (US); Michael G. Fattey, Lancaster, NY (US)

(73) Assignee: Moog Inc., East Aurora, NY (US)

( * ) Notice: Subject to any disclaimer, the term of this patent is extended or adjusted under 35 U.S.C. 154(b) by 158 days.

(21) Appl. No.: 17/910,775

(22) PCT Filed: Mar. 8, 2021

(86) PCT No.: PCT/US2021/021400
§ 371 (c)(1),
(2) Date: Sep. 9, 2022

(87) PCT Pub. No.: WO2021/183455
PCT Pub. Date: Sep. 16, 2021

(65) Prior Publication Data
US 2023/0122529 A1 Apr. 20, 2023

Related U.S. Application Data

(60) Provisional application No. 62/988,295, filed on Mar. 11, 2020.

(51) Int. Cl.
*H04N 17/00* (2006.01)
*G06T 7/593* (2017.01)
(Continued)

(52) U.S. Cl.
CPC .......... *H04N 17/002* (2013.01); *G06T 7/593* (2017.01); *G06T 7/85* (2017.01); *H04N 13/239* (2018.05);
(Continued)

(58) Field of Classification Search
CPC .......................................................... G06T 7/85
See application file for complete search history.

(56) References Cited

U.S. PATENT DOCUMENTS 9,503,703 B1 * 11/2016 Ramaswamy ............ G06T 7/85
10,131,280 B2 11/2018 De Wind et al.
(Continued)

FOREIGN PATENT DOCUMENTS

CN 106840242 A 6/2017
CN 108344580 A 7/2018
(Continued)

OTHER PUBLICATIONS

Olson (2018) "What if the sensors of a self driving car were damaged while driving at highway speeds?" Retrieved from https://www.quora.com/What-if-the-sensors-of-a-self-driving-car-were-damaged-while-driving-at-highway-speeds?: pp. 1-5.

*Primary Examiner* — Jayanti K Patel
*Assistant Examiner* — Christopher Kingsbury Glover
(74) *Attorney, Agent, or Firm* — Harter Secrest & Emery LLP

(57) ABSTRACT

An autonomous or semi-autonomous vehicle camera system including a camera having a field of view, wherein the camera is operable to receive optical information in the field of view. A display located in the camera field of view. A controller in electrical connection with the camera, wherein the controller is operable to conduct a Built-in-Test. Wherein the Built-in-Test is configured to present one or more images in the camera field of view via the display to determine functionality of the camera system.

19 Claims, 10 Drawing Sheets

200
204
206
208
202
210
212
204

(51) Int. Cl.
*G06T 7/80* (2017.01)
*H04N 13/239* (2018.01)
*H04N 13/271* (2018.01)

(52) U.S. Cl.
CPC . *H04N 13/271* (2018.05); *G06T 2207/10012* (2013.01)

(56) References Cited

U.S. PATENT DOCUMENTS

| | | | | |
|---|---|---|---|---|
| 2015/0103143 | A1* | 4/2015 | Hsueh | H04N 13/246 348/46 |
| 2018/0160087 | A1* | 6/2018 | Nill | B60K 35/00 |
| 2018/0373048 | A1 | 12/2018 | Hilldore et al. | |
| 2019/0064799 | A1 | 2/2019 | Amirloo | |
| 2019/0066399 | A1 | 2/2019 | Jiang et al. | |
| 2019/0108694 | A1 | 4/2019 | Huang et al. | |
| 2019/0195947 | A1 | 6/2019 | Sarangi et al. | |
| 2019/0210613 | A1 | 7/2019 | Sun et al. | |
| 2019/0279374 | A1 | 9/2019 | Kim et al. | |
| 2019/0279447 | A1 | 9/2019 | Ricci | |
| 2019/0392610 | A1* | 12/2019 | Cantadori | G01B 21/04 |

FOREIGN PATENT DOCUMENTS

| | | | | |
|---|---|---|---|---|
| EP | 1902900 | A2 | 3/2008 | |
| EP | 3125546 | A1 | 2/2017 | |
| EP | 3588001 | A1 | 1/2020 | |
| WO | WO-0228110 | A1 * | 4/2002 | H04N 17/002 |
| WO | 2012017334 | A2 | 2/2012 | |
| WO | 2017079219 | A1 | 5/2017 | |
| WO | WO-2020030465 | A1 * | 2/2020 | |

* cited by examiner

CAMERA SYSTEM IN SITUATION BUILT-IN-TEST

TECHNICAL FIELD

The present disclosure relates generally to a method and apparatus for camera system operation validation, and more specifically to an autonomous or semi-autonomous vehicle camera system Built-in-Test (BIT).

BACKGROUND

Cameras provide a data dense means of sensing the environment, and as such are employed in many robotics, autonomous vehicles, and safety assist applications. However, the same data density that makes cameras so appealing from a utility standpoint complicates their use in safety applications. Specifically, providing a thorough assurance that the camera and its associated software are operating properly can be difficult.

SUMMARY

The present disclosure provides a method and apparatus operable to exercise a camera system, including the associated software and hardware, to provide validation that the camera system is operating within predetermined parameters.

In a first exemplary embodiment, a camera system (100) includes a camera (102) having a field of view (106), wherein the camera is operable to receive optical information (108) in the field of view (106). A display (104) is located in the camera field of view (106). The vehicle camera system (100) also includes a controller in electrical connection with the camera (102). The controller is operable to conduct a Built-in-Test via presenting one or more images in the camera field of view (106) via the display (104) to determine functionality of the camera.

In a second exemplary embodiment, an autonomous or semi-autonomous vehicle camera system (300) includes a first camera (302A) having a first field of view (306A), wherein the first camera (302A) is operable to receive environmental information in the first field of view (306A), and a second camera (302B) having a second field of view (306B), wherein the second camera is operable to receive environmental information in the second field of view (306B), and the first and second fields of view (306A, 306B) at least partially overlap. The autonomous or semi-autonomous vehicle stereo camera system (300) further includes a display (304) located in the first and second fields of view (306A, 306B), and a controller in electrical connection with the first and second cameras (302A, 302B), wherein the controller is operable to conduct a Built-in-Test. The Built-in-Test is configured to present disparate images in the first and second fields of view (306A, 306B) via the display (304) to facilitate depth measurement and determine functionality of the camera system.

In a third exemplary embodiment, a method for autonomous or semi-autonomous vehicle camera system operation validation includes providing a camera (102) operable to receive real-time environmental information (108) in a field of view (106), a display (104) located in the camera field of view (106), and a controller in electrical connection with the camera (102), wherein the controller is operable to conduct a Built-in-Test. The method further includes conducting the Built-in-Test, including presenting test images of an obstacle to the camera (102) via the display (104), receiving the test images of the obstacle via the camera (102), and determining functionality of a safety architecture utilizing the received images of the obstacle.

In a fourth exemplary embodiment, a method for autonomous or semi-autonomous vehicle camera system operation validation includes providing a camera (302A, 302B) operable to receive real-time optical information in a field of view (306), and a controller (310) in electrical connection with the camera, wherein the controller comprises a safety integrity monitor (312) operable to conduct a Built-in-Test, and an image processing module (314). The controller is operable to receive information corresponding to the real-time optical information received by the camera. The safety integrity monitor comprises a test image bank operable to store test image data. The Built-in-Test includes transmitting the test image data to the image processing module, determining functionality of a safety architecture utilizing the transmitted test image data, and outputting a safety signal via the controller.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figures 1A, 1B:
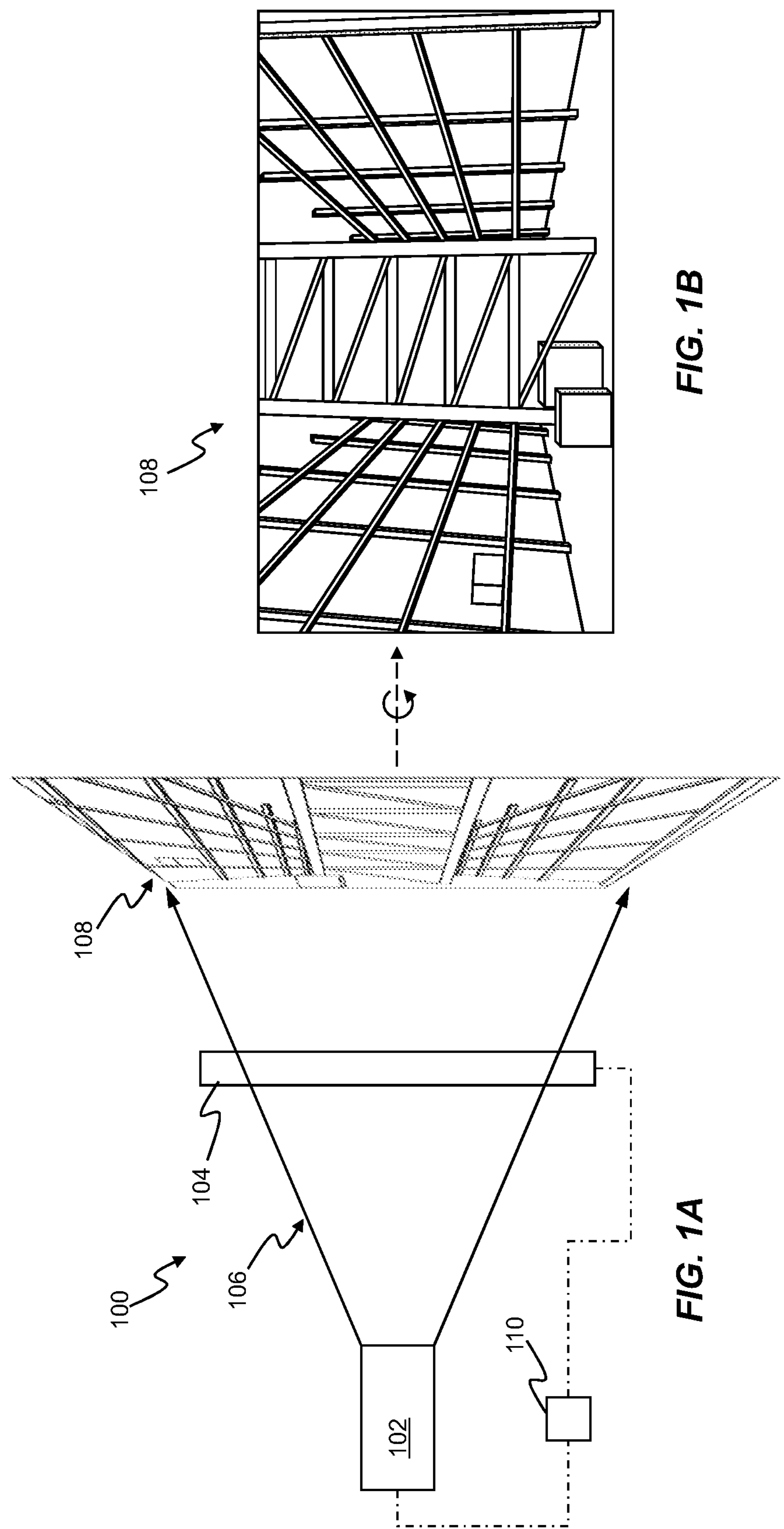
FIG. 1A shows a top plan view schematic of a camera system according to an embodiment of the present disclosure.
FIG. 1B shows an image captured by the camera system according to FIG. 1A.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

The present subject matter is directed to a method and apparatus for camera system operation validation, and more specifically to an autonomous and/or semi-autonomous vehicle camera system Built-in-Test (BIT).

As illustrated in FIGS. 1A and 1B, in an embodiment, a camera system 100 includes a camera 102 and a transparent display 104. The transparent display 104 is positioned (i.e., optically aligned) such that it intersects the full field of view 106 of the camera 102. During normal operation of the camera system 100, the camera 102 captures the environment 108 in the field of view 106 through the transparent display 104. In an embodiment, the transparent display 104 is a transparent organic light-emitting diode (OLED) video display, also known as a T-OLED display. In an embodiment, the camera 102 is a video camera.

The camera system 100 further includes a controller 110 connected in signal communication with the camera 102 and the transparent display 104. The controller 110 may be electrically connected with the camera 102 and the transparent display 104 via electrical wiring and/or soldering operable to transmit signals therebetween. In an embodiment, the controller 110 may be wirelessly connected with the camera 102 and the transparent display 104 via WiFi, Bluetooth, or other radio communications utilizing one or more transceivers. In an embodiment, one or more intervening objects, such as but not limited to electrical components, are located between the controller 110 and the camera 102 and between the controller 110 and the transparent display 104. The controller 110 is operable to perform an end-to-end BIT whereby the camera system 100 validates internal functionality. In an embodiment, during the BIT the transparent display 104 shows images interlaced and/or superimposed with the environment captured by the camera 102 on an every-other-frame basis. The BIT enables the camera system 100 to self-analyze system functionality. Utilizing a transparent display 104 operable to display an image every-other-frame creates a BIT interval that provides continuous periodic testing of system functionality. Continuous periodic testing ensures high system reliability. In addition to, or in place of, periodic system testing, the camera system 100 may utilize a system start-up BIT.

In an embodiment, during the BIT the transparent display 104 shows a pre-recorded warehouse worker to test and verify operation of an autonomous vehicle safety architecture, such as a forklift navigation system, in a simulated safety situation requiring identification of personnel. The camera 102 records/captures the image displayed and transmits a signal to the controller 100 to verify functionality of navigation and safety protocols.

In an embodiment, during the BIT the transparent display 104 turns ON/OFF each individual pixel (i.e., black screen/bright screen) to ensure function. This BIT technique is similar to a raster scan, illuminating one pixel at a time. Using this technique, critical aspects of the camera system 100 operation are validated. This technique can be extended to fully exercise the red/green/blue color filters associated with color cameras on a one pixel at a time basis.

Figure 2:
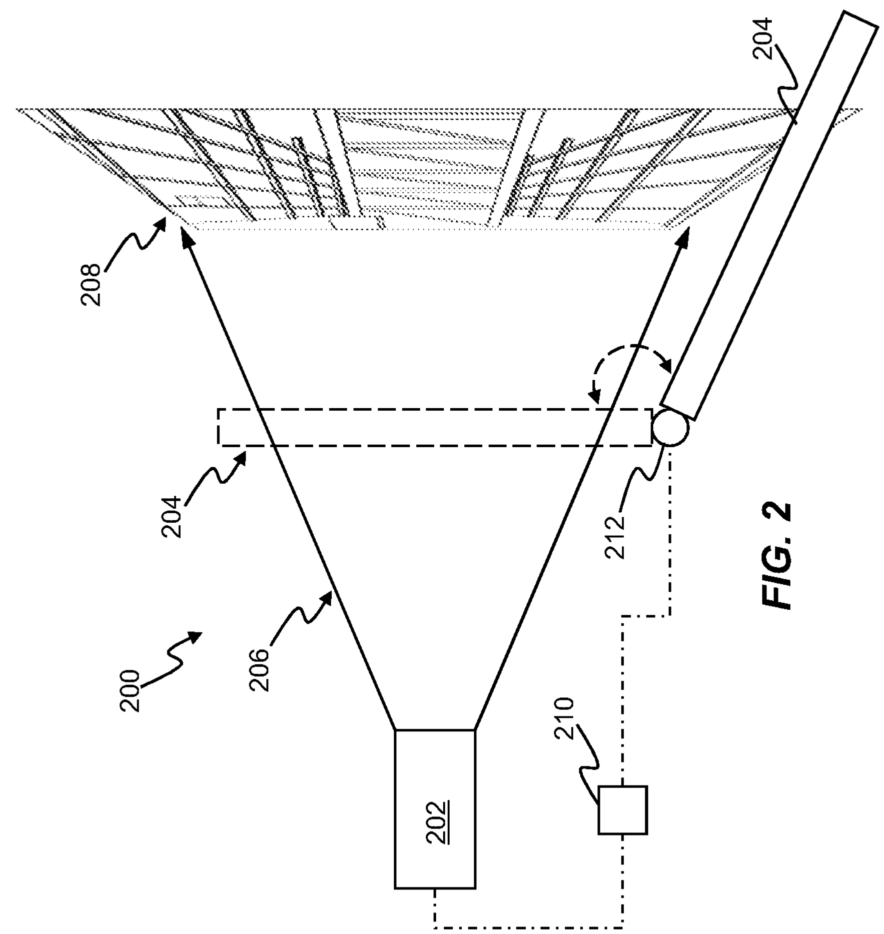
FIG. 2 shows a top plan view schematic of a camera system according to an embodiment of the present disclosure.

As illustrated in FIG. 2, in an embodiment, a camera system 200 includes a video camera 202 and an opaque display 204. During normal operation of the camera system 200, the opaque display 204 is positioned outside the field of view 206 of the camera 202. During periodic and/or system start-up BIT's, as described above, the opaque display 204 is actuated into the field of view 206 of the camera 202. For example, the opaque display 204 may be operable to rotate about at least one axis (e.g., on a hinge 212) into, and out of, the camera field of view 206. In an embodiment, the camera system 200 may utilize system start-up BIT, so as to avoid interruption of regular operation.

Figure 3:
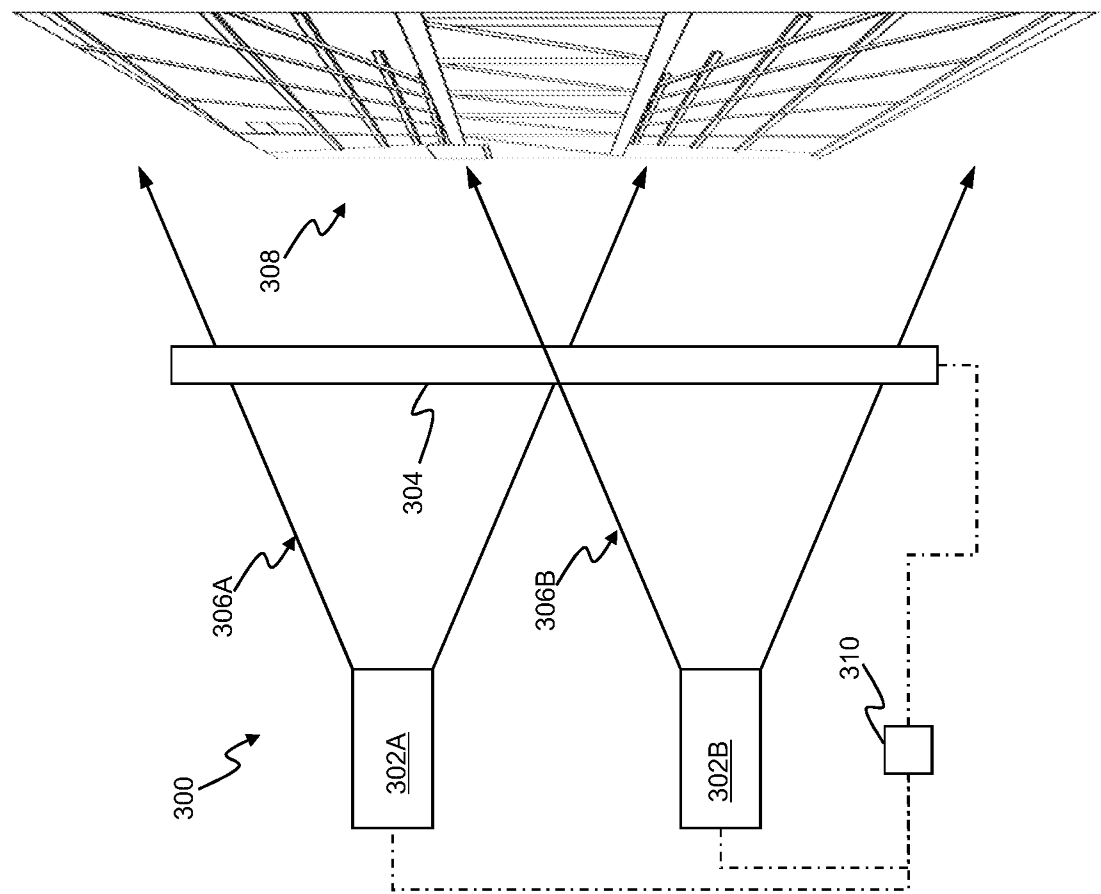
FIG. 3 shows a top plan view schematic of a stereo camera system according to an embodiment of the present disclosure.

In an embodiment, as illustrated in FIG. 3, a camera system 300 includes a first camera 302A, a second camera 302B, and a transparent display 304. The transparent display 304 is positioned (i.e., optically aligned) such that it intersects the full fields of view 306A, 306B of the first and second cameras 302A, 302B, respectively. The transparent display 304 is operable to show disparate images required for depth measurement. The camera system 300 BIT is utilized to verify the functionality of a stereo imager. In this embodiment, the Built-in-Test is operable to verify the ability of the cameras 302A, 302B to accurately sense depth, which is a critical element in autonomous vehicle obstacle detection and avoidance.

The camera system 300 allows direct testing of the desired function at a system level. In some cases, this testing can be mathematically rigorous, allowing for very high percentage testing of the desired functionality. As described herein, obstacle detection testing provides an example of high percentage testing of the desired camera system 300 functionality. In other cases, such as object classification, the image processing algorithm may achieve less than 100% accuracy. However, validating functionality of the image processing algorithm is itself valuable. If basic function of the image processing algorithm can be validated, then the camera system 300 can be part of the statistical hazard mitigation system.

In obstacle detection, a depth image may first be captured utilizing the camera system 300. The depth image is then filtered. In an embodiment, the image is filtered utilizing a low pass blur filter. However, persons skilled in the art will recognize that a variety of filters can be effectively applied. Thresholding of the filtered image is then performed based on depth, then a blob detector is utilized to identify the remaining contiguous regions (i.e., the blobs) within the image. If the identified blobs are larger than a predetermined size, the blobs are registered as obstacles. The centroid of each registered obstacle is found, and the location of each obstacle is recorded. In an embodiment, the centroid of each registered obstacle is identified utilizing the blob detector program. If the blob is in the Region of Interest (ROI), a fault is signaled.

In an embodiment, the camera system 300 interlaces a set of validation images with one or more images captured via the camera system 300. The set of validation images is interlaced with the images captured via the cameras 302A, 302B utilizing the transparent display 304. In an embodiment, a real-time image of the environment in the field of view 306A, 306B is captured via the cameras 302A, 302B through the transparent display 304. The transparent display 304 then presents/displays a validation image (i.e., test image) in an interval after the cameras 302A, 302B capture the real-time image, and the cameras 302A, 302B capture the validation image. The transparent display 304 is then cleared, such that another real-time image may be captured. In this process the controller 310 monitors two sets of images, the real-time images and the validation images. However, the operational software and hardware utilized to monitor the two sets of images is identical.

Utilizing this method, a validation image having a blob can be displayed and captured, and cleared from the transparent display 304 before the next real-time environment image is captured, and the results of a vehicle safety architecture program can be validated on a real time basis. To ensure good coverage of the safety architecture program (i.e., comprehensive testing), the blob is located in different portions of one or more images of the validation image set (i.e., walked around the images), and the size of the blob is changed in one or more images of the validation image set (i.e., shrank and grown). The crucial obstacle detection aspect of the camera system 300 can be validated while the camera system 300 is in operation (i.e., the safety architecture can determine whether the system is operable to detect blobs above a certain size in each region of an image). Furthermore, using a virtual reality engine (e.g., the Unity engine and/or Unity Simulation by Unity Technologies), the camera system 300 can provide 100% mathematical coverage over a period of time. In an embodiment, a set of validation images that comprehensively exercises all of the pixels in the cameras 302A, 302B and the supporting hardware/software are provided via the controller 310. The set of validation images are operable to check that each pixel is operational by, at least, determining that each pixel registers a correct value when exposed to the stimulus of the validation image set. In an embodiment, this entails utilizing the validation image set to check for correct color capture and identification via stimulating the cameras 302A, 302B with green, red, and blue light. In an embodiment, the real-time image captured by the cameras 302A, 302B is optical information concerning the area surrounding the camera system 300 and/or vehicle within the field of view 306A, 306B.

The camera system 300 BIT is operable to certify the functionality of algorithms developed in open source software packages (e.g., OpenCV). More specifically, the BIT displays images via the transparent display 304 on a frame-by-frame basis to test the entire string of operations performed by the camera system 300 according to the predetermined specifications of the obstacle detection algorithm. In other words, the entire camera system 300 can be validated to be operating properly on a frame-by-frame basis.

For example, where the obstacle detection algorithm is set to detect objects larger than two-hundred pixels within a particular viewing zone, the BIT initially projects images of an obstacle smaller than two-hundred pixels via the transparent display 304, the BIT then iteratively increases the pixel-size of the obstacle until it is detected and its location communicated to a safety card 312 (e.g., one or more printed circuit boards (PCB's) and/or integrated circuits comprising computer memory) connected and/or integrated with the controller 310. The safety card 312 is operable as a memory sequencer to output pre-recorded images to the transparent display 304 on an every-other-frame basis and as a status indicator operable to check for the expected answer. The safety card 312 may also be referred to herein as a safety integrity monitor.

The camera system 100, 200, 300 allows for end-to-end, frame-by-frame, testing to enable use of many of the latest versions of open-source vision system software and hardware in safety related or high reliability systems without the traditional, full process, verification that is applied to such system software and hardware. The camera system 100, 200, 300 actively validates—rather than verifies—the hardware and software while it is in operation.

Figure 4A:
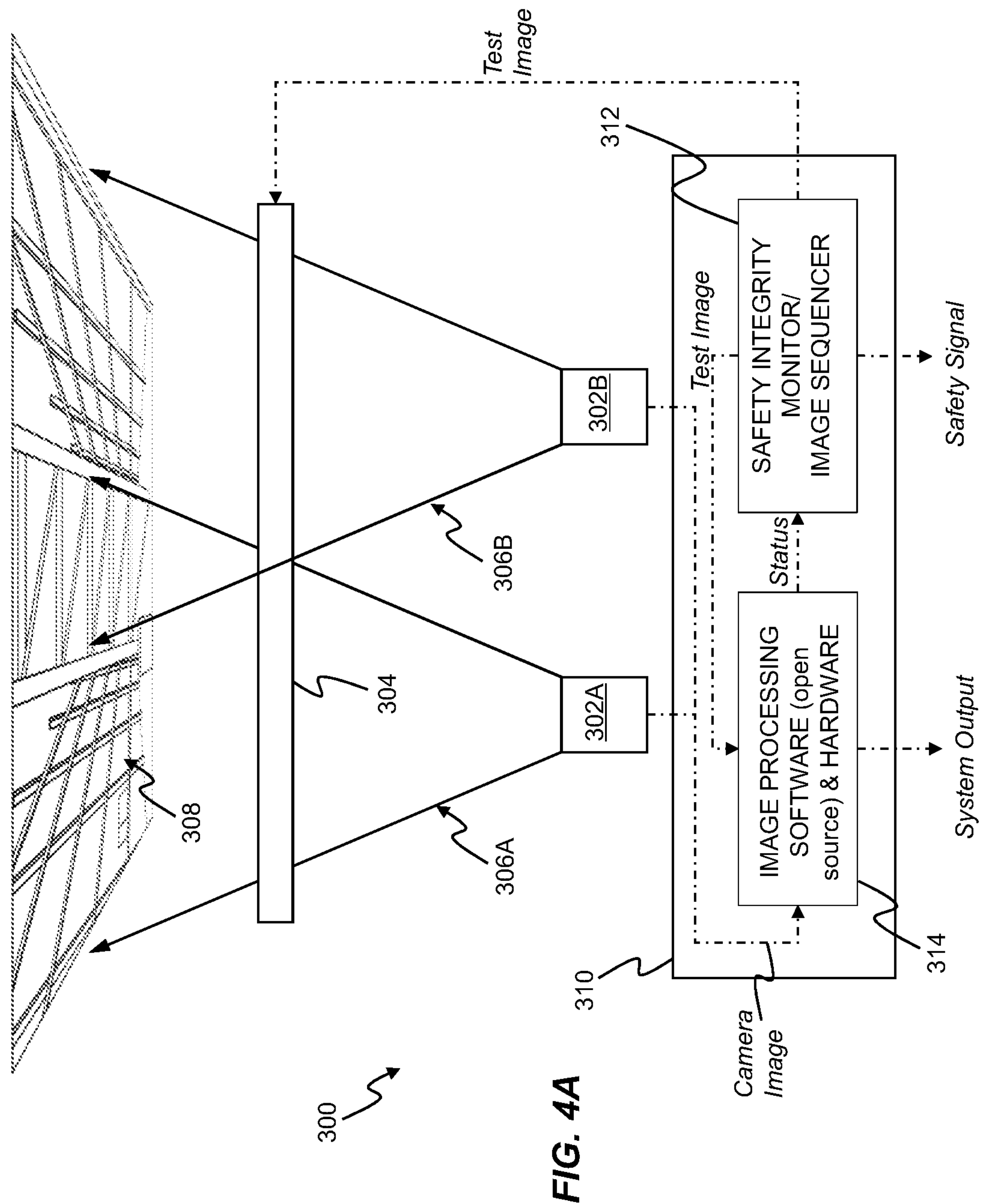
FIG. 4A shows a top plan view schematic of a camera system according to FIG. 3 having an image sequencer.
Figure 4B:
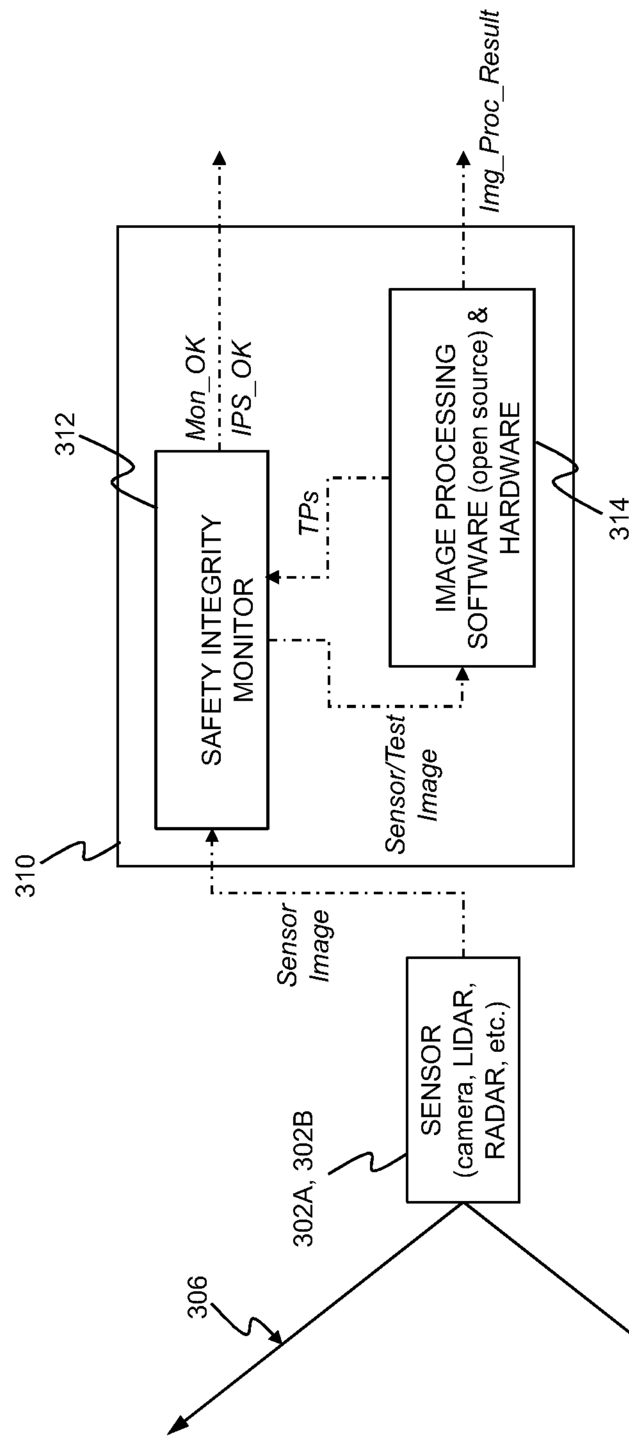
FIG. 4B shows a schematic of a camera system according to an embodiment of the present disclosure.
Figure 4C:
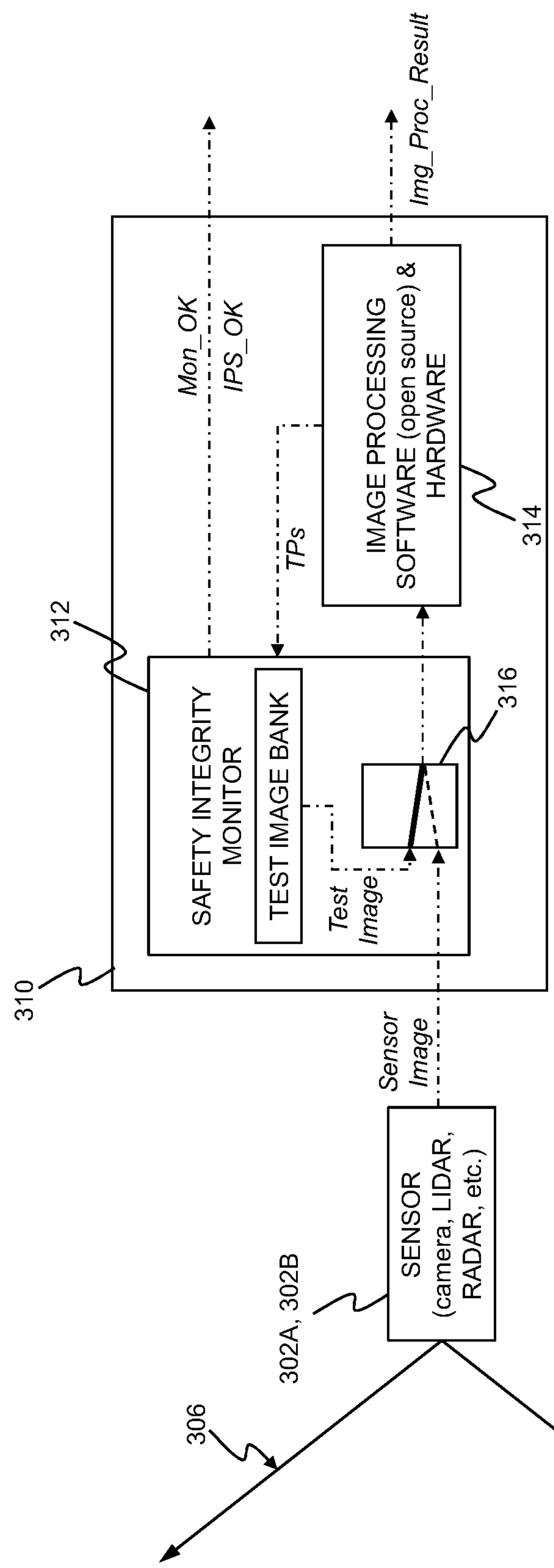
FIG. 4C shows a schematic of a vision system according to an embodiment of the present disclosure.

In an embodiment, as illustrated in FIGS. 4A, 4B, 4C, the camera system safety card 312 includes an image sequencer. The image sequencer may be utilized to test the software of the camera system 300 independently of the cameras 302A, 302B and/or sensors of the camera system 300. The BIT is operable to communicate a sequence of validation images from the image sequencer multiplexed with the real-time environment images captured by the first and second cameras 302A, 302B to the image processing software 314. In an embodiment, the image processing software 314 is located on a single-board computer or processor. The alignment and health of the first and second cameras 302A, 302B can be separately and periodically validated with simple, in-image, fiducials (i.e., a small, known, target deliberately placed in the camera's image space and periodically searched for in order to verify basic operation). The image processing software 314 is operable to communicate a signal TPs to the safety card 312.

As illustrated in FIGS. 4B and 4C, in an embodiment, the safety integrity monitor 312 multiplexes the live image data from the camera 302A, 302B and data from the validation image set (i.e., test image bank/image sequencer). The camera 302A, 302B and image processing software 314 of the controller 310 are responsible for the functional image processing, while the safety integrity monitor 312 is used to continuously check the camera 302A, 302B. The camera system 300 may support separate image threads (i.e., sequences of programmed instructions). In an embodiment, the BIT is implemented with identical threads. In another embodiment, the BIT is implemented utilizing a single thread whose data/results are parsed. In an embodiment, the cameras 302A, 302B may include, or be replaced by, sensors such as, but not limited to, a LiDAR and/or radar sensor.

As illustrated in FIG. 4C, in an embodiment, a BIT checks the operability of software and hardware of the camera system 300, but does not check the functionality of the sensors 302A, 302B. A switch 316 is operable to selectively connect either the sensors 302A, 302B or the test image bank with the image processing module 314 of the controller 310. The memory storing the validation image set (i.e., the test image bank/image sequencer) may be validated via rotating the validation image set between strings to account for failures in the memory.

Figure 5:
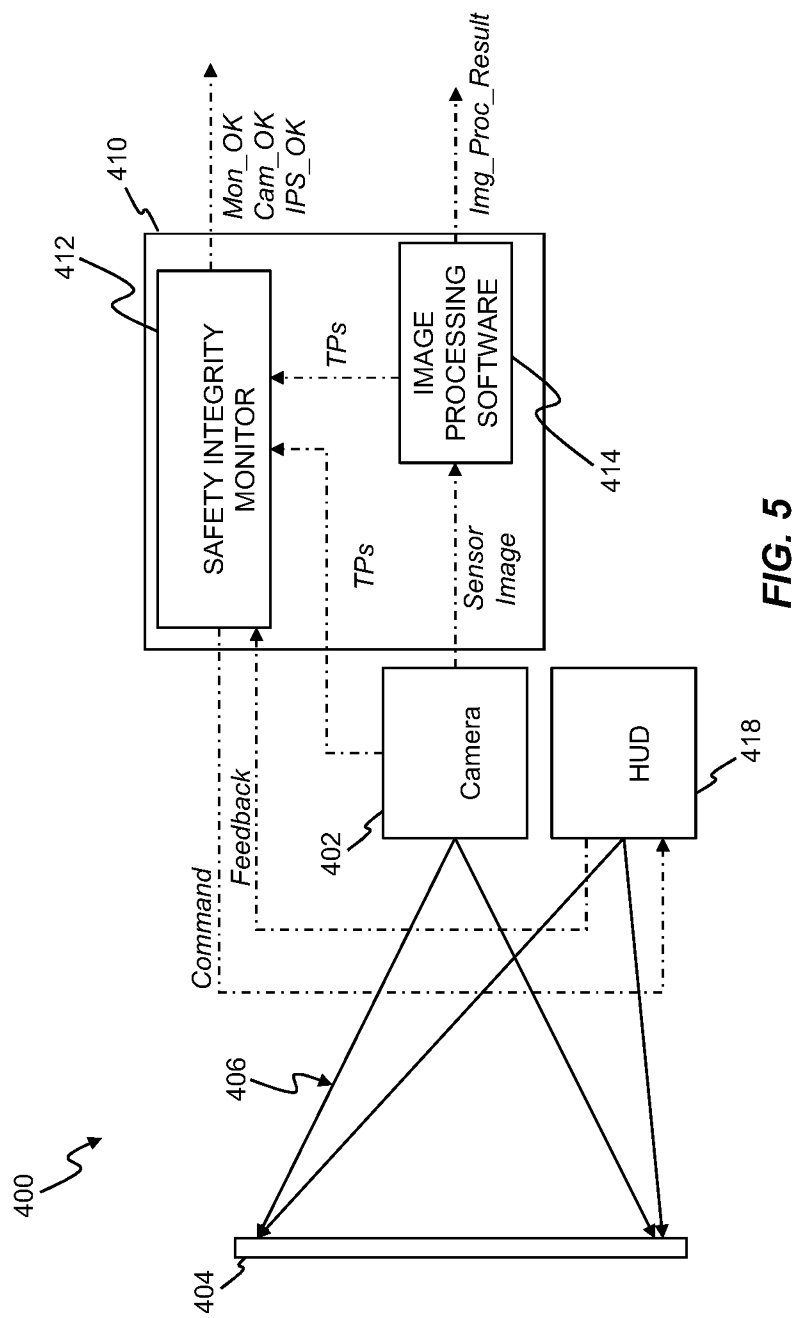
FIG. 5 shows a schematic of a camera system according to an embodiment of the present disclosure.

As illustrated in FIG. 5, in an embodiment, a camera system 400 includes a camera 402 and a transparent display 404. The transparent display 404 is positioned (i.e., optically aligned) such that it intersects the full field of view 406 of the camera 402. During normal operation of the camera system 400, the camera 402 captures the real-time environment 408 in the field of view 406 through the transparent display 404. In an embodiment, the transparent display 404 is a transparent pane of glass. The camera system 400 also includes a heads-up-display (HUD) projector 418 operable to project validation images onto the transparent display 404. In an embodiment, the projector 418 is located on the same side of the display 404 as the camera 402. The camera system 400 includes a controller 410 in signal communication with the camera 402 and the projector 418. The controller 410 comprises a safety integrity monitor 412 and image processing software 414. The controller 410 is operable to perform an end-to-end BIT whereby the camera system 400 validates internal functionality as described with respect to camera systems 100, 200, 300.

Figure 6:
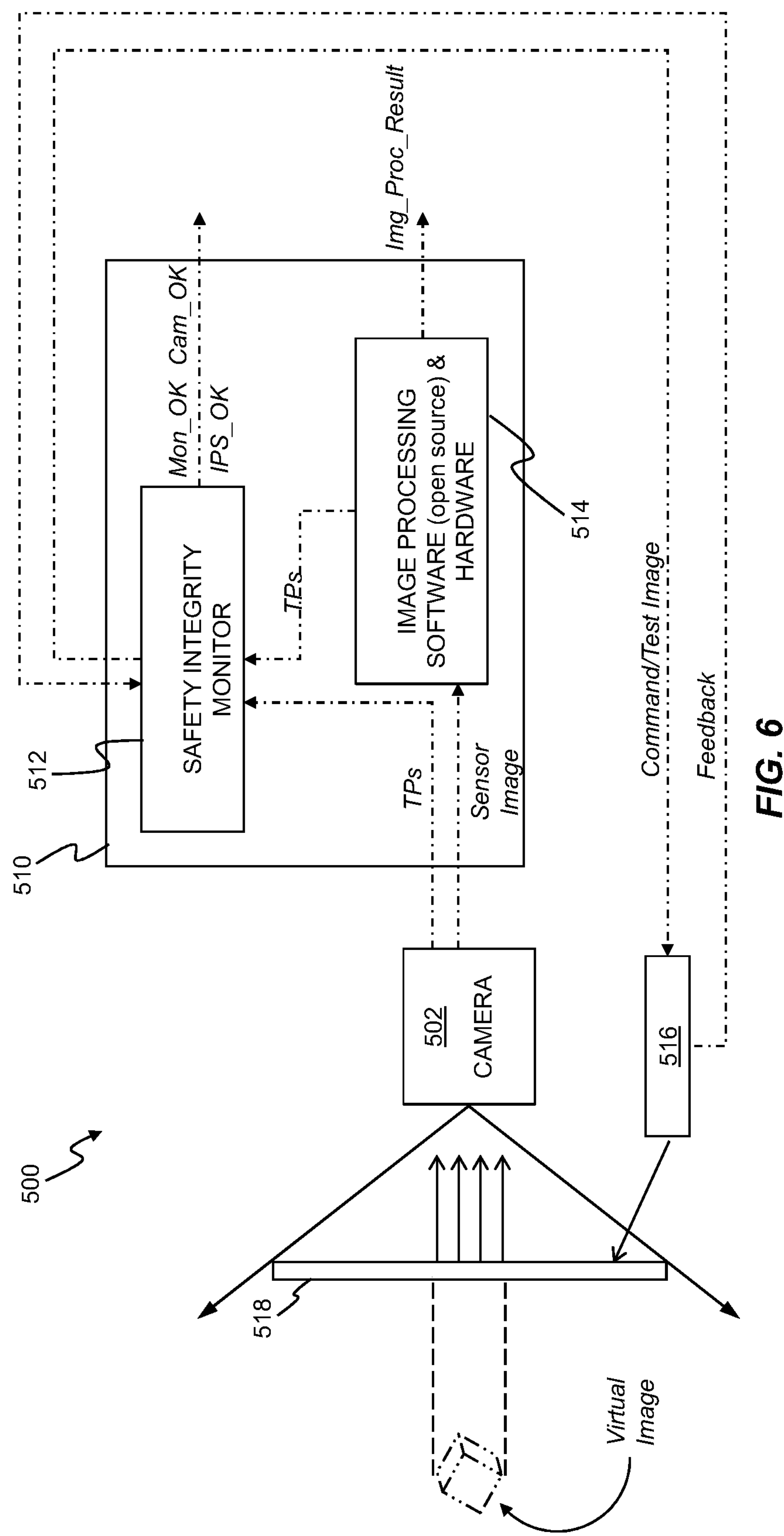
FIG. 6 shows a schematic of a camera system according to an embodiment of the present disclosure.

In an embodiment, as illustrated in FIG. 6, a camera system 500 includes one or more cameras 502 in electrical communication with a controller 510. The controller 510 includes a safety integrity monitor 512 and image processing software 514 as described with regard to the camera system 300, 400. The camera system 500 also utilizes optics 516 such as, but not limited to, projectors, prisms, mirrors, and/or lenses, and/or imaging light-guides 518 to generate a validation image within the field of view of the camera 502.

Figure 7:
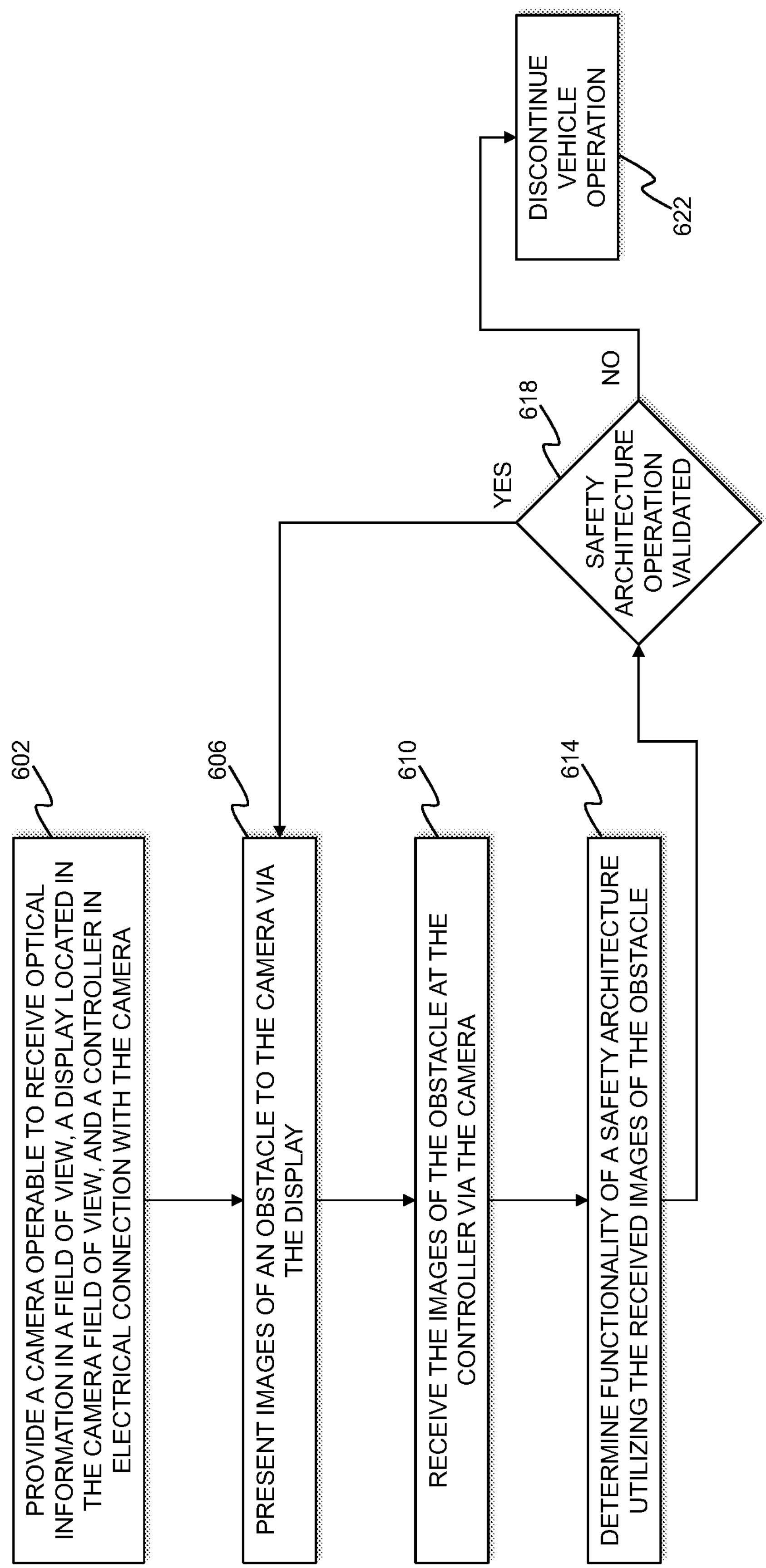
FIG. 7 is a flow chart of a safety architecture Built-In-Test according to an embodiment of the present disclosure.

An embodiment of a method of performing a BIT is shown in FIG. 7. The method includes providing a camera operable to receive optical information in a field of view, a display located in the camera field of view, and a controller in electrical connection with the camera in a step 602. In step 606 images of an obstacle are presented to the camera via the display. As shown in step 610, the images of the obstacle captured by the camera are transmitted to the controller. The controller determines functionality of a safety architecture utilizing the received images of the obstacle in step 614. In step 618 the operation of the safety architecture is validated or not validated. If the safety architecture is validated, the BIT is reset (e.g., the BIT operates on an every-other-frame basis). If the safety architecture is not validated, the BIT outputs a signal to discontinue vehicle operation.

Figure 8:
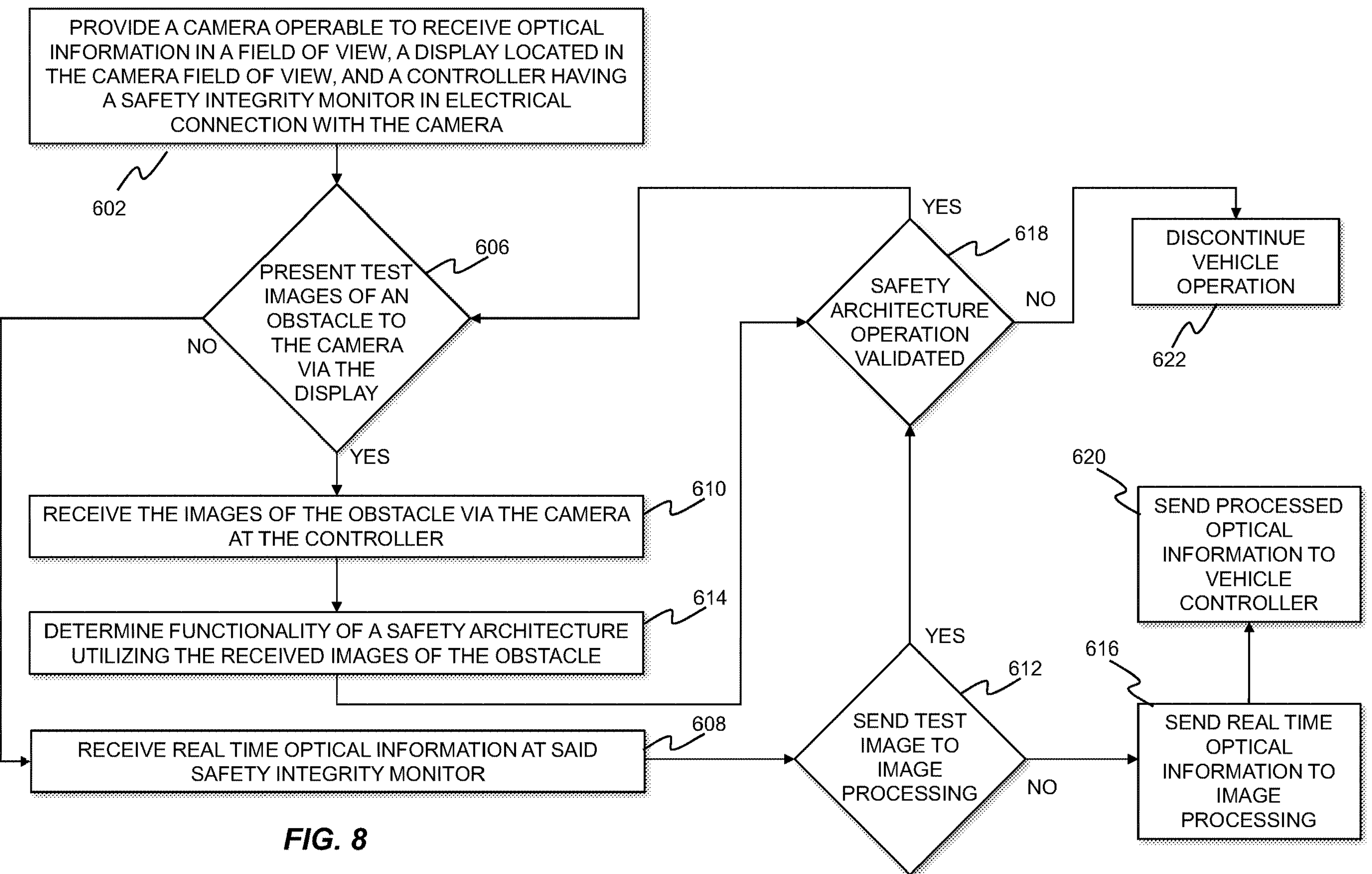
FIG. 8 is a flow chart of a safety architecture Built-In-Test according to an embodiment of the present disclosure.

An embodiment of a method of performing a BIT is shown in FIG. 8. The method includes providing a camera operable to receive optical information in a field of view, a display located in the camera field of view, and a controller in electrical connection with the camera in a step 602. In step 606 the BIT either outputs images of an obstacle to the camera via the display, or does not. As shown in step 610, if the BIT in step 606 outputs test images of the obstacle, the images of the obstacle captured by the camera are transmitted to the controller. The controller determines functionality of a safety architecture utilizing the received images of the obstacle in step 614. In step 618 the operation of the safety architecture is validated or not validated. If the safety architecture is validated, the BIT is reset (e.g., the BIT operates on an every-other-frame basis). If the safety architecture is not validated, the BIT outputs a signal to discontinue vehicle operation. As shown in step 608, if the BIT in step 606 does not output a test image, the camera captures real-time image information and transmits the image information to the safety integrity monitor. In step 612 the BIT either transmits a test image to image processing or does not. If the test image is transmitted to image processing the BIT performs steps 618 and 622. If the test image is not transmitted to image processing, the BIT transmits the real-time image information to image processing in step 616. The BIT then transmits the processed optical information to a vehicle controller in step 620.

In an embodiment, the camera system 100, 200, 300, 400, 500 disclosed herein may be utilized in autonomous or semi-autonomous vehicle navigation and/or guidance vision systems. In another embodiment, the camera system 100, 200, 300, 400, 500 disclosed herein may be utilized in a machine safety system to identify dangerous placement of personnel relative to the machine. For example, a machine having a cutting tool may utilize the camera system 100, 200, 300, 400, 500 to identify when an appendage of personnel is located within a ROI and provide a signal to shut down the machine. The described embodiments are thereby provided with mechanisms that enable the camera system to perform diagnostics and test itself without the need or use of external test equipment.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A camera system, comprising:

a vehicle mounted camera having a field of view, wherein said camera is operable to receive optical information in said field of view;

a vehicle mounted flat-panel display located in said camera field of view, wherein said display is substantially transparent whereby said camera receives said optical information entirely through said display; and a controller in electrical connection with said camera, wherein said controller is operable to conduct a Built-in-Test;

wherein said Built-in-Test is configured to present one or more validation images in said camera field of view via said display to determine functionality of said camera in a vision system of said vehicle.

2. The camera system according to claim 1, wherein said controller comprises: a memory component; a processor in communication with said memory component, wherein said processor is operable to execute instructions stored on said memory component to conduct said Built-in-Test; and an image sequencer operable to communicate said one or more validation images to said processor.

3. The camera system according to claim 1, wherein said camera is a video camera having a frame rate, and said Built-in-Test is operable to present said one or more validation images on said display at a display rate less than said video camera frame rate.

4. The camera system according to claim 1, wherein said camera is operable to transmit optical information of said one or more validation images presented via said display to said controller.

5. The camera system according to claim 1, wherein said Built-in-Test is operable to change individual pixels of said display between an ON state and an OFF state to determine an ability of said camera system to recognize predetermined images.

6. The camera system according to claim 1, wherein said camera comprises a complementary metal-oxide-semiconductor (CMOS).

7. The camera system according to claim 1, wherein said camera comprises a charge-coupled device (CCD).

8. An autonomous vehicle camera system, comprising: a first camera having a first field of view, wherein said first camera is operable to receive a first real-time image in said first field of view; a second camera having a second field of view, wherein said second camera is operable to receive a second real-time image in said second field of view, and said first and second fields of view at least partially overlap; a display located in said first and second fields of view; and a controller in electrical connection with said first and second cameras, wherein said controller is operable to conduct a Built-in-Test; wherein said Built-in-Test is configured to present disparate images in said first and second fields of view via said display to facilitate depth measurement and determine functionality of a safety architecture, wherein said controller is operable to output a signal indicating functionality of said safety architecture whereby vehicle operation is continued or discontinued.

9. The autonomous vehicle camera system according to claim 8, wherein said Built-in-Test is operable to verify functionality of one or more algorithms by presenting frame-by-frame images to said first and second cameras via said display whereby a string of operations of said one or more algorithms is compared with predetermined operating specifications.

10. The autonomous vehicle camera system according to claim 9, wherein said one or more algorithms are operable to detect objects in said first and second fields of view larger than a predetermined number of corresponding pixels of said display within a zone of said display; and wherein said Built-in-Test is operable to (i) present an image of an object having fewer pixels than said predetermined number of corresponding pixels, (ii) iteratively present said image of an object having fewer pixels than said predetermined number of corresponding pixels with an increasing number of pixels in each iteration until said image of an object is detected via said first and second cameras, (iii) record and store said detected image of an object in said controller, (iv) provide frame-by-frame output of said recorded image of an object to said display, and (v) verify function of said string of operations.

11. The autonomous vehicle camera system according to claim 9, wherein said controller comprises a sequencer operable to output a pre-recorded image of an object on an every-other frame basis as an algorithm status indicator.

12. The autonomous vehicle camera system according to claim 9, wherein said controller is operable to multiplex a pre-recorded image of an object with real-time images received by said first and second cameras to verify function of said one or more algorithms.

13. A method for vehicle camera system operation validation, comprising: providing: a camera operable to receive optical information in a field of view; a display located in said camera field of view; and a controller in electrical connection with said camera, wherein said controller is operable to conduct a Built-in-Test; conducting said Built-in-Test, comprising: presenting images of an obstacle to said camera via said display, receiving said images of said obstacle via said camera, determining functionality of a safety architecture utilizing said received images of said obstacle.

14. The method for vehicle camera system operation validation according to claim 13, wherein said display is substantially transparent whereby said camera receives said optical information entirely through said display.

15. The method for vehicle camera system operation validation according to claim 13, further comprising: providing a second camera operable to receive optical information in a second field of view, wherein said first and second fields of view at least partially overlap, and wherein said display is located in said first and second fields of view; presenting frame-by-frame images of an object having fewer than a predetermined number of pixels to said camera via said display, wherein said images of said object have an increasing number of pixels in each iterative frame; detecting said image of said object via said camera after one or more iterations; recording said detected image of said object; outputting said recorded image of said object to said display every-other frame; and determining functionality of said safety architecture utilizing said recorded image.

16. A method for vehicle camera system operation validation, comprising: providing: a camera operable to receive real-time optical information in a field of view; and a controller in electrical connection with said camera, wherein said controller comprises a safety integrity monitor operable to conduct a Built-in-Test, and an image processing module; wherein said controller is operable to receive information corresponding to said real-time optical information received by said camera, and wherein said safety integrity monitor comprises a test image bank operable to store test image data; conducting said Built-in-Test, comprising: transmitting said test image data to said image processing module, determining functionality of a safety architecture utilizing said transmitted test image data, and outputting a safety signal via said controller.

17. The method for vehicle camera system operation validation according to claim 16, wherein said test image data is multiplexed with said real-time optical information.

18. The method for vehicle camera system operation validation according to claim 16, wherein said image processing module comprises open source software, and wherein said Built-in-Test continuously validates operation of said open source software.

19. An autonomous vehicle camera system, comprising:

a first camera having a first field of view, wherein said first camera is operable to receive a first real-time image in said first field of view;

a second camera having a second field of view, wherein said second camera is operable to receive a second real-time image in said second field of view, and said first and second fields of view at least partially overlap;

a flat-panel display located in said first and second fields of view, wherein said display is substantially transparent whereby said first and second cameras receive said optical information entirely through said display; and a controller in electrical connection with said first and second cameras, wherein said controller is operable to conduct a Built-in-Test;

wherein said Built-in-Test is configured to present disparate images in said first and second fields of view via said display to facilitate depth measurement and determine functionality of a safety architecture, wherein said Built-in-Test is operable to verify functionality of one or more algorithms by presenting frame-by-frame images to said first and second cameras via said display whereby a string of operations of said one or more algorithms is compared with predetermined operating specifications.

* * * * *